US008641961B2

(12) United States Patent
Hamamchyan

(10) Patent No.: US 8,641,961 B2
(45) Date of Patent: Feb. 4, 2014

(54) METHOD OF MANUFACTURING BUILDING BRICK

(76) Inventor: Mikayel Hamamchyan, Yerevan (AM)

(*) Notice: Subject to any disclaimer, the term of this patent is extended or adjusted under 35 U.S.C. 154(b) by 387 days.

(21) Appl. No.: 12/995,948

(22) PCT Filed: May 6, 2009

(86) PCT No.: PCT/AM2009/000001
§ 371 (c)(1),
(2), (4) Date: Dec. 2, 2010

(87) PCT Pub. No.: WO2009/146470
PCT Pub. Date: Dec. 10, 2009

(65) Prior Publication Data
US 2011/0074069 A1  Mar. 31, 2011

(30) Foreign Application Priority Data
Jun. 2, 2008 (AM) .................. 20080069

(51) Int. Cl.
*C04B 33/04* (2006.01)
*B28B 3/08* (2006.01)

(52) U.S. Cl.
USPC .......................... 264/638; 264/639

(58) Field of Classification Search
USPC ................. 264/638, 639
See application file for complete search history.

(56) References Cited

U.S. PATENT DOCUMENTS

| 1,363,264 A | * | 12/1920 | Orth | 264/675 |
|---|---|---|---|---|
| 2,000,338 A | * | 5/1935 | Kliefoth | 501/147 |
| 3,366,498 A | * | 1/1968 | Osborne | 501/128 |
| 4,725,390 A | * | 2/1988 | Laird et al. | 264/660 |
| 4,737,326 A | * | 4/1988 | Wirth et al. | 264/641 |
| 5,549,859 A | * | 8/1996 | Andersen et al. | 264/102 |
| 5,658,624 A | * | 8/1997 | Anderson et al. | 428/34.7 |
| 2004/0251573 A1 | * | 12/2004 | Schmid | 264/109 |
| 2007/0164471 A1 | * | 7/2007 | Gorden | 264/176.1 |
| 2010/0117273 A1 | * | 5/2010 | Warmerdam et al. | 264/645 |
| 2011/0193252 A1 | * | 8/2011 | Gorden | 264/40.4 |

FOREIGN PATENT DOCUMENTS

| RU | 2004518 C1 | 12/1993 |
|---|---|---|
| RU | 2036880 C1 | 6/1995 |
| RU | 2233815 C2 | 8/2004 |
| SU | 1779678 A1 | 12/1992 |

OTHER PUBLICATIONS

Mehta, P. Kumar. "High-performance, high-volume fly ash concrete for sustainable development." In Proceedings of the international workshop on sustainable development and concrete technology, pp. 3-14. 2004.*

WO/2009/146470 A1 with International Search Report dated Aug. 6, 2009.

* cited by examiner

*Primary Examiner* — Joseph S Del Sole
*Assistant Examiner* — Russell Kemmerle, III
(74) *Attorney, Agent, or Firm* — Rader, Fishman & Grauer PLLC

(57) ABSTRACT

A method of manufacturing building bricks provides for mixing quartz sand, which can be barkhan bare sand, with clay and starch. NaOH and water, which can be technical water or sea water, are added to the mixture which is then subjected to semidry shaping and baking. The resulting light weight bricks produced in a simple and economical way possess low thermal conductivity, are heat- and frost proof, chemical-resistant, and biorefractory.

1 Claim, No Drawings

METHOD OF MANUFACTURING BUILDING BRICK

CROSS-REFERENCE TO RELATED APPLICATIONS

This application is a U.S. National phase application of the International application WO 2009/146470 A1 (PCT/AM2009/000001) and claims priority to application AM20080069 filed on Jun. 2, 2008, in Armenia, both applications being hereby incorporated by reference in their entirety.

BACKGROUND OF THE INVENTION

1. Field of the Invention

The present invention relates to building materials, in particular to manufacturing light, stable and hollow man-made bricks and stones for brickwork.

2. Description of the Related Art

Known is a method of manufacturing building brick and stone (RU 2233815 (2002)), according to which a batch of carbonated sandy clay (85-90%) and micro-silica (10-15 wt. %) is prepared and exposed to granulation in the presence of water solution of sulphate soap. Obtained granulated compound is molded, dried and burnt at 950° C.

Also known is a method of manufacturing facing bricks tiles (RU 2070177 (1996)), which includes wet milling of manufacturing waste products (10-15 wt. % of broken glass and 10-15 wt. % of thermophosphate slag), its blending with 32.5 wt. % of high-quality and 32.5 wt. % of low-grade (sand-mixed) clay, further milling, and drying. Obtained is a 4-8 wt. % humid granulated molding compound, which is exposed to half-dry molding and burn.

There is a method of manufacturing ceramic bricks for wall incrustation (RU 2036880 (1995)), according to which a batch is first prepared comprising the following components (wt. %) clay slate (60-80), pearlite or obsidian (5-20) or broken glass (5-20), quicklime (5-10) and as much of solution of sodium hydroxide. The forming of compound is realized by half-dry method, applying 22-4 MPa pressure. The obtained bricks are dried down to 1% residual moisture and burnt, the temperature raising at 200-300° C. an hour and staying at 750-800° C. for 1-3 hours.

The material thus obtained possesses the following parameters: water absorption 2-10%, freeze-thaw resistance 25-50 cycles, compressive strength of 22-45 MPa.

This method has a number of drawbacks. The bricks are not strong enough to use them as load-bearing ones. A large proportion of clay used, with shrinkage characteristic therefor, requires prior slow drying of bricks to avoid cracking during burn. The use of quicklime complicates the manufacturing process and requires big expenditures of energy associated with limestone burn and crushing lime.

SUMMARY OF THE INVENTION

The object of the invention is to produce building bricks (brick units) for brickwork which would possess low thermal conductivity and light weight, would be heat- and frost proof, chemical-resistant and biorefractory and would be produced in a simple and economical way.

The essence of the invention is that for manufacturing building tubing bricks and stone, natural raw materials are used: a mixture of quartz sand and low-melting clay in the 2.33:1 (wt. %) ratio, to which 0.8-1 wt. % of starch is also added. Added to the dry mixture thus made is a liquid component, which is a solution of caustic soda in technical (non potable) or seawater (6.25 parts of the dry mixture to one part of the NaOH solution with volume weight of 1.4 g/cm$^3$). The end humid and friable mass is exposed to semidry shaping. The obtained raw bricks are baked for 1.5 hour at 960-1050° C.

DETAILED DESCRIPTION OF THE INVENTION

The process of the manufacturing of building bricks comprises several steps:

1. Preparing Primary Raw Materials.

Since the natural fineness of barkhan sand and its humidity meet the requirements imposed, it is only to be screened by the sieve with the mesh size of 0.7-0.8 mm.

The low-melting clay is exposed to drying (down to residual moisture of 6-8%), after which it is milled in a hammer crusher and screened by a vibrating screen with the mesh size of 0.7-0.8 mm.

2. Producing Batch.

The sand and clay in the ratio of 2.33:1 (wt. %) are mixed with 1 wt. % of starch in a double-shaft mixer, as a result of which a dry mixture is obtained. Adding some NaOH and water to the dry mixture results in obtaining humid, yet friable, molding compound.

3. Shaping Raw Bricks.

The molding compound having 10-11% of humidity is exposed to semidry shaping at a hydraulic press under 35-50 kg/cm$^3$ two-sided pressure.

4. Baking Raw Bricks.

Baking is accomplished in a 48 m long tunnel kiln, which is conditionally separated into three zones. In a heating zone, the brick remains for 3.5 hour, in a baking zone, where the temperature reaches up to 960-1050° C., it remains for 1.5 hours, and in a cooling zone it remains for 7 hours.

EXAMPLE 100 g of barkhan sand are mixed with clay in the 2.33:1 proportion and 1 g of starch, to which mixture 6.67 ml of caustic soda ($\rho$=1.4 g/cm$^3$) and 6.67 ml of seawater (with 33 g/l content of salt) are then added. The resultant semidry composition is pressed under 35-50 kg/cm$^3$ pressure and baked for 1.5 hour at 960-1050° C. The same example is repeated using quartz sand and technical water.

The present method is of particular importance for the areas where providing building materials and water have been a challenge, but which have inexhaustible and not of great value raw materials: desert sand and seawater.

Presented in Table 1 below are comparative technical characteristics of the resultant product branded "SICLAY" and other building materials of the same purpose.

TABLE 1

| N | Indexes | SICLAY | Ceramic brick GOST 530-80 | Silica brick GOST 379-95 | Concrete GOST 6133-59 | Armenian tuff |
|---|---|---|---|---|---|---|
| 1 | Water-absorbence % | 11-12 | 16-25 | 18-22 | 6-8 | 11-19 |
| 2 | Heat conductivity $\lambda$ = Vt/m °C. | 0.58-0.65 | 0.33-0.22 | 0.81-0.87 | 0.89-1.0 | 0.45-0.55 |
| 3 | Thermal resistance (20 cm) R = $m^2$ x° C./Vt | 0.35-0.31 | 0.23-0.20 | 0.33-0.22 | 0.25-0.23 | 0.44-0.36 |
| 4 | Breaking point kg/$m^2$ | 80-120 | 35-100 | 75-150 | 25-35 | 60-100 |
| 5 | Density kg/$m^3$ | 1100-1300 | 1600-1800 | 1600-1800 | 1800-2000 | 1500-1800 |

The bricks and stones produced by the above-described method may be used for outdoor and indoor brickwork, for constructing other elements of buildings and constructions, as well as for making wall panels and blocks.

SICLAY's rectangular block standard size is 40×20×20 $cm^3$. The block has 3 cylinder holes, the emptiness is 38-40%, but by customer order it can be formed any way, following GOST 530-80 requirements.

The present tubing stone, which has heat engineering characteristics and density illustrated in table 1, is considered to be effective, as it provides a way to reduce the wall thickness down to 40 cm afforded by two layer brickwork.

The invention claimed is:

1. A method of manufacturing building bricks, comprising the steps of:

providing sand, clay, and starch;

mixing the sand and clay in 2.33:1 wt. % ratio and adding 1 wt. % of starch thereto;

adding water solution of NaOH to the mixture in the ratio of 6.25 parts of the mixture and one part of the solution, whereby humid and friable molding compound is obtained;

subjecting the compound to semidry shaping, to thereby form raw bricks; and baking the raw bricks;

wherein the sand includes quartz sand, wherein the clay comprises 46.5 (wt. %) of $SiO_2$; 11.9% of $Al_2O_3$; 2.3% of $K_2O$; 11.1% of CaO+MgO; 6.3% of $Fe_2O_3$; and 6.5% of $P_2O_3$, and wherein the water includes technical (non potable) water or seawater.

* * * * *